US011481088B2

(12) United States Patent
Cardinal et al.

(10) Patent No.: US 11,481,088 B2
(45) Date of Patent: Oct. 25, 2022

(54) DYNAMIC DATA DENSITY DISPLAY

(71) Applicant: International Business Machines Corporation, Armonk, NY (US)

(72) Inventors: Matthew Cardinal, Austin, TX (US); Spencer Thomas Reynolds, Austin, TX (US); Ramratan Vennam, Durham, NC (US); Belinda Marie Vennam, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 16/820,248

(22) Filed: Mar. 16, 2020

(65) Prior Publication Data

US 2021/0286478 A1 Sep. 16, 2021

(51) Int. Cl.
*G06F 3/0482* (2013.01)
*G06F 3/04845* (2022.01)
*G06F 11/34* (2006.01)
*G06F 16/907* (2019.01)

(52) U.S. Cl.
CPC ........ *G06F 3/0482* (2013.01); *G06F 3/04845* (2013.01); *G06F 11/3438* (2013.01); *G06F 16/907* (2019.01)

(58) Field of Classification Search
CPC .. G06F 11/3438; G06F 16/907; G06F 3/0482; G06F 3/04845
See application file for complete search history.

(56) References Cited

U.S. PATENT DOCUMENTS

| | | | |
|---|---|---|---|
| 6,327,574 B1 | 12/2001 | Kramer | |
| 6,633,315 B1 | 10/2003 | Sobeski | |
| 7,526,731 B2 | 4/2009 | Bushey | |
| 7,620,894 B1 | 11/2009 | Kahn | |
| 7,661,069 B2 | 2/2010 | Lindsay | |
| 7,881,708 B2 | 2/2011 | Anttila | |
| 8,352,884 B2 | 1/2013 | Zalewski et al. | |
| 8,990,688 B2 | 3/2015 | Lee et al. | |
| 10,452,240 B2 | 10/2019 | Louch | |
| 2005/0015728 A1 | 1/2005 | Ragan | |
| 2007/0118804 A1 | 5/2007 | Raciborski | |
| 2009/0319923 A1 | 12/2009 | Schaller | |
| 2012/0054635 A1* | 3/2012 | Park | G06F 9/451 715/769 |
| 2012/0096410 A1* | 4/2012 | Lancaster | G06F 3/0482 715/854 |
| 2014/0115466 A1* | 4/2014 | Barak | G06F 9/451 715/765 |
| 2014/0201345 A1* | 7/2014 | Abuelsaad | G06F 21/60 709/223 |

(Continued)

*Primary Examiner* — Beau D Spratt
*Assistant Examiner* — Reji Kartholy
(74) *Attorney, Agent, or Firm* — VanLeeuwen & VanLeeuwen; Alexander Jochym

(57) ABSTRACT

An approach is provided in which the approach displays, on a user interface during a first user session, a set of objects with a first level of detail based on a prioritization model. The approach adjusts the prioritization model based on a set of user selections to the set of objects captured during the first user session that indicates a second level of detail of at least one object in the set of objects. The approach displays the set of objects to the user on the user interface during a second user session based on the adjusted prioritization model.

15 Claims, 7 Drawing Sheets

(56) References Cited

U.S. PATENT DOCUMENTS

| | | |
|---|---|---|
| 2015/0332166 A1 | 11/2015 | Ferens |
| 2016/0334974 A1* | 11/2016 | Gray ..................... G06F 3/0482 |
| 2019/0026286 A1* | 1/2019 | Zhang ................. G06F 3/04817 |
| 2019/0056856 A1* | 2/2019 | Simmons ................. G06F 16/34 |
| 2019/0065440 A1* | 2/2019 | Lu ....................... G06F 9/44526 |
| 2019/0087887 A1* | 3/2019 | Westphal ........... G06Q 30/0631 |

\* cited by examiner

Configuration Menu 500

| | 510 Simple Detail | 520 Preferred Detail | 530 Complex Detail |
|---|---|---|---|
| Object Type A (540) | X | X | X |
| Metadata a | X | X | X |
| Metadata b | ☐ | X | X |
| Metadata c | ☐ | ☐ | X |
| Object Type B (550) | X | X | X |
| Metadata d | X | ☐ | ☐ |
| Metadata e | ☐ | X | ☐ |
| Metadata f | ☐ | ☐ | X |
| Object Type C (560) | ☐ | X | X |
| Metadata g | ☐ | X | X |
| Metadata h | ☐ | ☐ | X |
| Object Type D (570) | X | X | ☐ |
| Metadata i | X | X | ☐ |
| Metadata j | ☐ | X | ☐ |

[SAVE]

FIG. 5

DYNAMIC DATA DENSITY DISPLAY

BACKGROUND

Electronic devices typically include a graphical user interface (GUI) that allows user interaction through graphical elements and audio indicators. GUIs were introduced in reaction to a perceived steep learning curve of command-line interfaces (CLIs), which require commands to be typed on a computer keyboard.

The actions in a GUI are usually performed through direct manipulation of the graphical elements. In viewing details on a GUI, an overwhelming amount of content may be displayed to a user, much of which is not relevant. Particularly when viewing a large number of objects that have multiple pieces of associated metadata. For example, in a website that provides streaming music, each song can include details such as the title, artist, album name, album cover image, lyrics, date of release, song length, and more. Each of the different detailed items associated with an object may appeal to a different subset of users.

BRIEF SUMMARY

According to one embodiment of the present disclosure, an approach is provided in which the approach displays, on a user interface during a first user session, a set of objects with a first level of detail based on a prioritization model. The approach adjusts the prioritization model based on a set of user selections to the set of objects captured during the first user session that indicates a second level of detail of at least one object in the set of objects. The approach displays the set of objects to the user on the user interface during a second user session based on the adjusted prioritization model.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 5 is an exemplary diagram depicting a data density level configuration menu;

DETAILED DESCRIPTION

Figure 1:
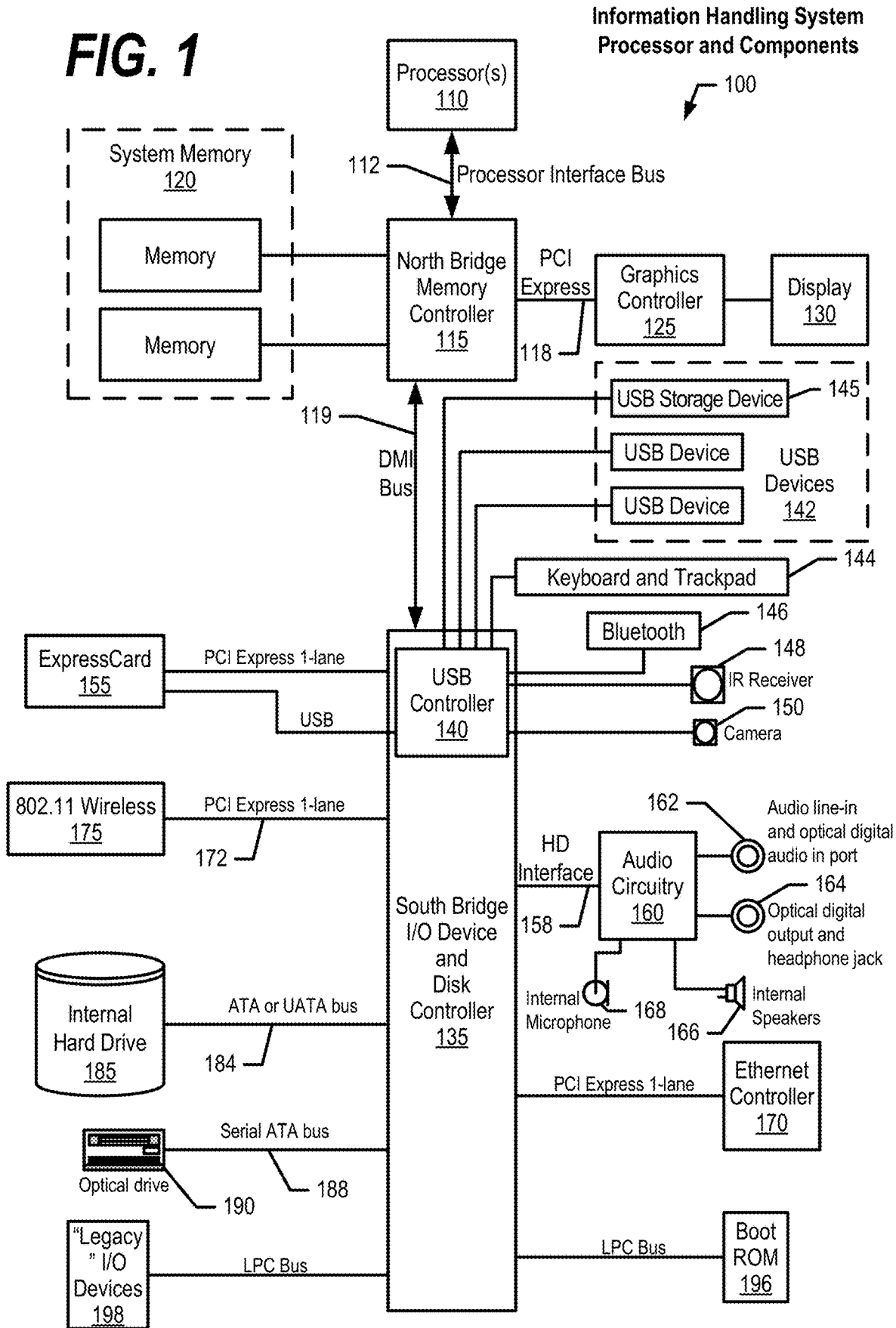
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
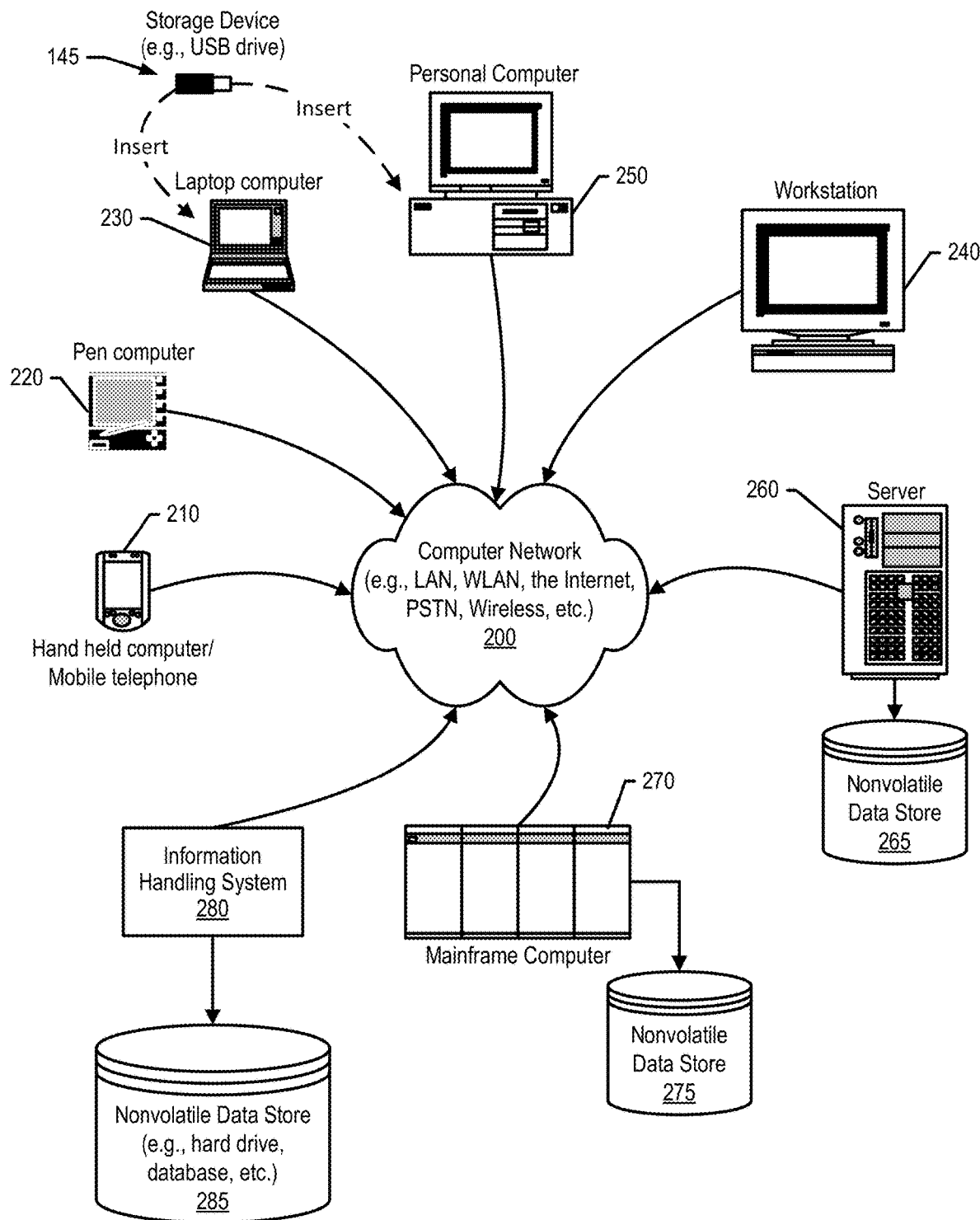
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, GUIs often provide a substantial amount of detail to attempt to satisfy a large group of users. However, when the GUI presents irrelevant detail or too many details, users experience a decrease in productivity or information overload. For example, a cloud's dashboard user interface may provide a GUI with a table of resources and items in the table that display associated details about the resources. This often leads to wasted time as users are required to parse through a plethora of information to find their particular information of interest.

FIGS. 3 through 7 depict an approach that can be executed on an information handling system that allows users to prioritize available details displayed on a GUI and quantity of details per object displayed on the GUI based on an individual's previous interaction behavior. The approach increases user productivity by displaying metadata that a specific individual requires without overloading the user with additional unnecessary details.

In one embodiment, the approach dynamically enables the user to adjust the amount of objects and object details on the GUI. In this embodiment, the amount and type of objects and details shown will initially be based on a model created by understanding historical interaction behavior of existing users with a similar profile. Over time, as the approach gathers data about the user's interaction behavior, the approach updates and optimizes the type of data and the amount of data to present to the user.

As discussed herein, object types are a type of display object (e.g., icons), such as security group objects, virtual machine resource objects, etc. An object is any item with multiple pieces of associated metadata. For example, a user views a group of songs (the songs are the objects) and each song has a variety of metadata such as length in seconds, album, release date, artist, etc.

Figure 3:
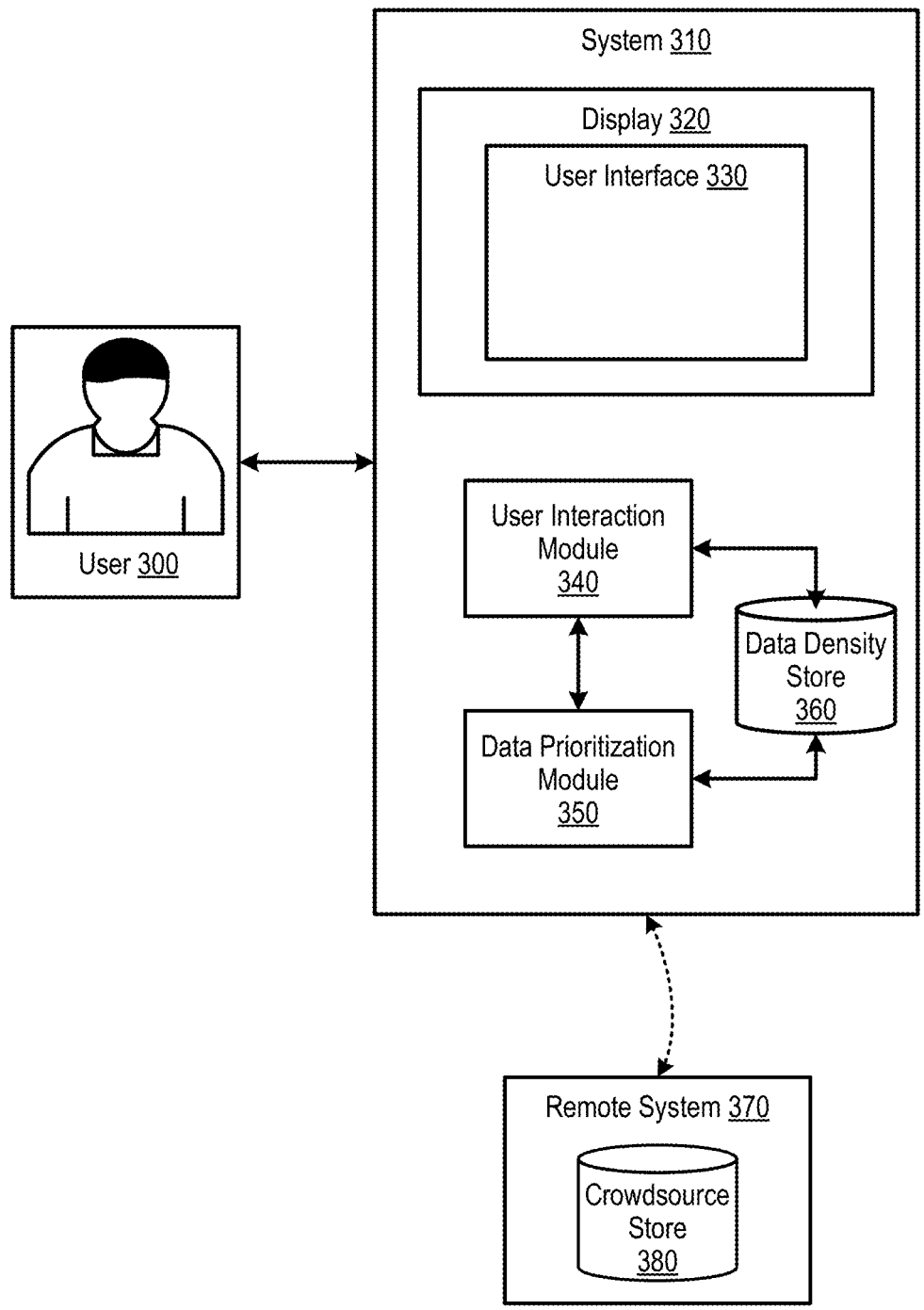
FIG. 3 is an exemplary diagram depicting a user interacting with a dynamic data density display system.

FIG. 3 is an exemplary diagram depicting a user interacting with a dynamic data density display system. User 300 uses system 310 (laptop, smart phone, etc.) to log into an application for the first time. System 310 captures profile information from user 300 and data prioritization module 350 creates an initial prioritization model of importance for objects and details to display with each of those objects. The data prioritization model is stored on data density store 360. In one embodiment, system 310 accesses remote system 370 to retrieve crowdsourced data density information from crowdsource store 380 and uses the crowdsourced data density information to create the initial prioritized order (see FIG. 7 and corresponding text for further details). In another embodiment, system 310 provides a configuration menu to user 300 via display 320 for user 300 to enter information (see FIG. 5 and corresponding text for further details).

Over time, system 310 tracks user 300's interaction behavior on user interface 330 via user interaction module 340 to determine which objects and metadata user 300 prefers for each set of objects. At any time and based on a continually updated prioritization model, the user can interact with a provided user interface component (object) to increase or decrease the number of unique pieces of metadata that are shown per individual object as well as unique objects shown (see FIG. 7 and corresponding text for further details).

Based on user 300's interactions, in one embodiment, system 310 generates and updates a score for each metadata item associated with the various objects as well as the distinct objects themselves. System 310 then adjusts the prioritization model based on user 300's actions for each set of objects and associated details to create a personalized prioritization model for user 300.

In one embodiment, a web page displayed on display 320 use a Document Object Model (DOM) to structure the contents of the page in a hierarchical manner. The DOM is constructed as a tree of nodes wherein each node represents a part of the page, and each node is an encapsulation of one or more UI elements with which user 300 interacts. In this embodiment, system 310 assigns a prioritization score to each of the DOM nodes, which is used to determine the size and visibility of the node, thereby restructuring user interface 330.

Once data prioritization module 350 customizes the prioritization model for user 300, system 310 uses a variety of approaches to adjust the objects and number of details surfaced for a particular object to display in user interface 330. In one embodiment, user interface 330 includes a slider bar with discrete points on a spectrum for the number of pieces of metadata (see FIG. 4 and corresponding text for further details). In another embodiment, user interface 330 includes a toggle that enables user 300 to move up and down between '0-n' pieces of metadata to be displayed for a particular set of objects.

Figure 4:
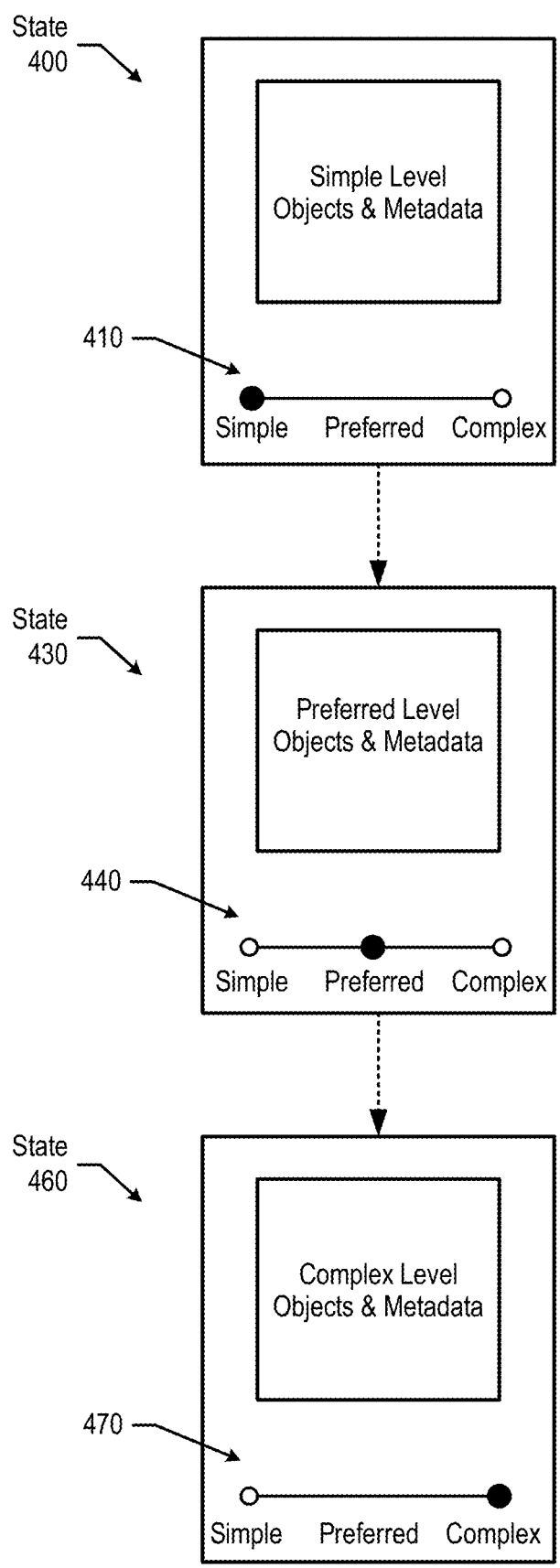
FIG. 4 is an exemplary diagram depicting a dynamic data density display system progressing through different levels of data density.

FIG. 4 is an exemplary diagram depicting a dynamic data density display system progressing through different levels of data. Each object may have multiple pieces of associated metadata that corresponds to a prioritization model based on user 300's historical behavior. In one embodiment, user 300 uses a configuration window to adjust the type of metadata shown on a particular object and the prioritization model for metadata associated with that component is used to determine which metadata should be populated in (or removed) first, then second, and so on (see FIG. 5 and corresponding text for further details).

State 400 shows user interface 330 in a "Simple" detail level based on selection 410 of the slide bar. In this state, user interface 330 shows objects and metadata in a less detail manner, such as high level object information. State 430 shows user interface 330 in a "Preferred" detail level based on selection 440 of the slide bar. In this state, user interface 330 shows objects and metadata in a preferred detail level per the customized prioritization model as discussed herein. State 460 shows user interface 330 in a "Complex" detail level based on selection 470 of the slide bar. In this state, user interface 330 shows objects and metadata in a complex detail level.

In one embodiment, the approach described herein supports more or less levels than a simple, preferred, or complex level as shown in FIG. 4. In this embodiment, the approach allows as many levels of complexity as the number of pieces of metadata for a particular object. For example, if a song has eight different types of associated metadata, the simplest level shows zero pieces of metadata and the most complex level includes all eight pieces of metadata, with seven levels in between the simplest and the most complex level of the object and its associated metadata.

FIG. 5 is an exemplary diagram depicting a data density level configuration menu. System 310 displays configuration menu 500 to user 300. In one embodiment, system 310 retrieves crowdsourced information corresponding to user 300's attributes (age, interests, job role, etc.) and pre-selects the detail levels for each object types and corresponding metadata. In this embodiment, user 300 may adjust the detail level for individual object types and/or metadata as needed. In another embodiment, system 310 provides configuration menu 500 without pre-selections and waits for user 300 to enter the detail level information.

Configuration menu 500 includes three detail level columns, which are simple detail 510, preferred detail 520, and complex detail 530. Configuration menu 500 also includes preference selections for five different object types 540, 550, 560, and 570. Each of the five different object type areas include their corresponding detail level selections.

As discussed herein, user 300's preferred detail level adjusts over time as system 310 monitors user 300's interactions. For example, configuration menu 500 shows that object type B is currently included in user 300's preferred detail level but, over time, user 300 may minimize object type B (or corresponding metadata types) when interacting with user interface 330. In this example, system 310 deselects object type B (or certain metadata types) from user 300's preferred detail level. In addition, system 310 may also deselect object type B from user 300's simple detail level while keeping object type B as part of user 300's complex detail level.

Figure 6:
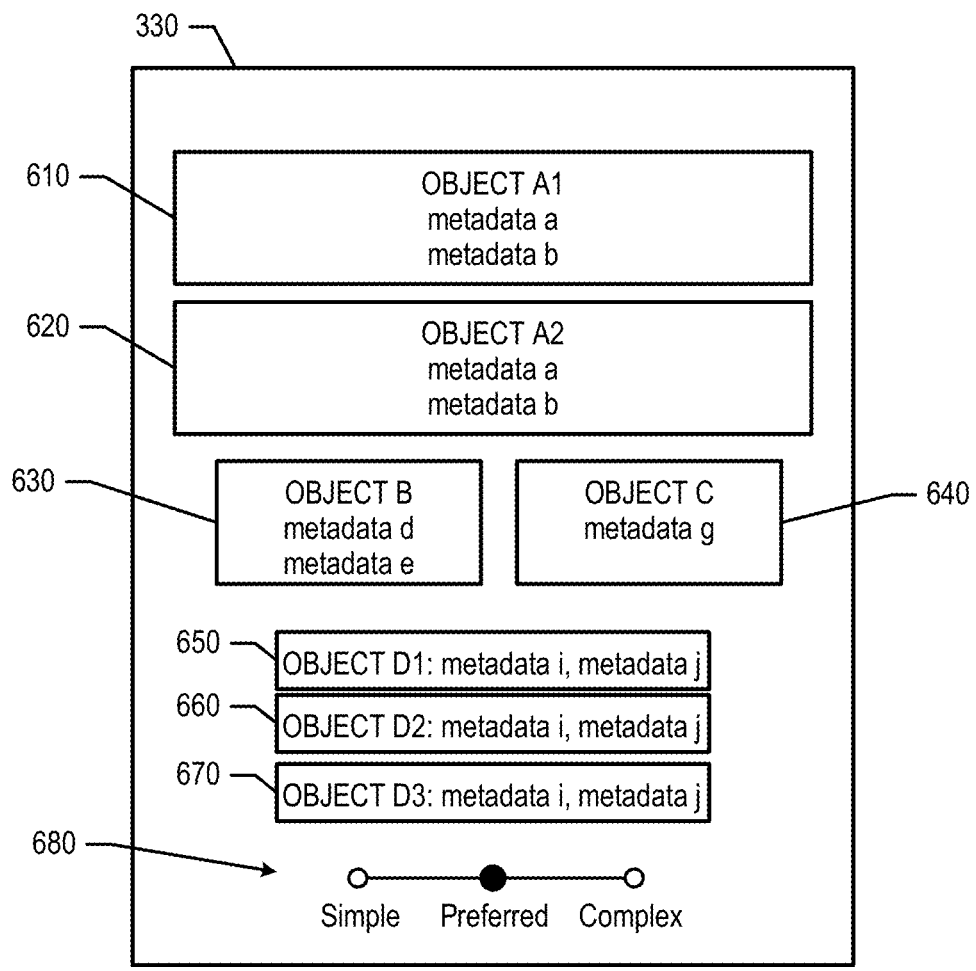
FIG. 6 is an exemplary diagram depicting an example of a dynamic data density display based on a user defined set of parameters.

FIG. 6 is an exemplary diagram depicting an example of a dynamic data density display based on a user defined set of parameters as shown in FIG. 5. Display 600 includes detail selection bar 680 that currently selects a "Preferred" detail view. As such, display 600 shows objects and their corresponding metadata according to preferred detail column 520 shown in FIG. 5. As discussed herein, system 310 automatically adjusts these selections based on user 300 interactions over time with user interface 330.

User interface 330 includes two object type As 610 and 620 with their corresponding metadata a and b based on selections shown in area 540 in FIG. 5. User interface 330 includes one object type B 630 with its corresponding metadata d and e based on selections shown in area 550 in FIG. 5.

User interface 330 includes one object type C 640 with its corresponding metadata g based on selections shown in area 560 in FIG. 5. User interface 330 includes three object type Ds 650, 660, and 670 with their corresponding metadata i and j based on selections shown in area 570 in FIG. 5.

Figure 7:
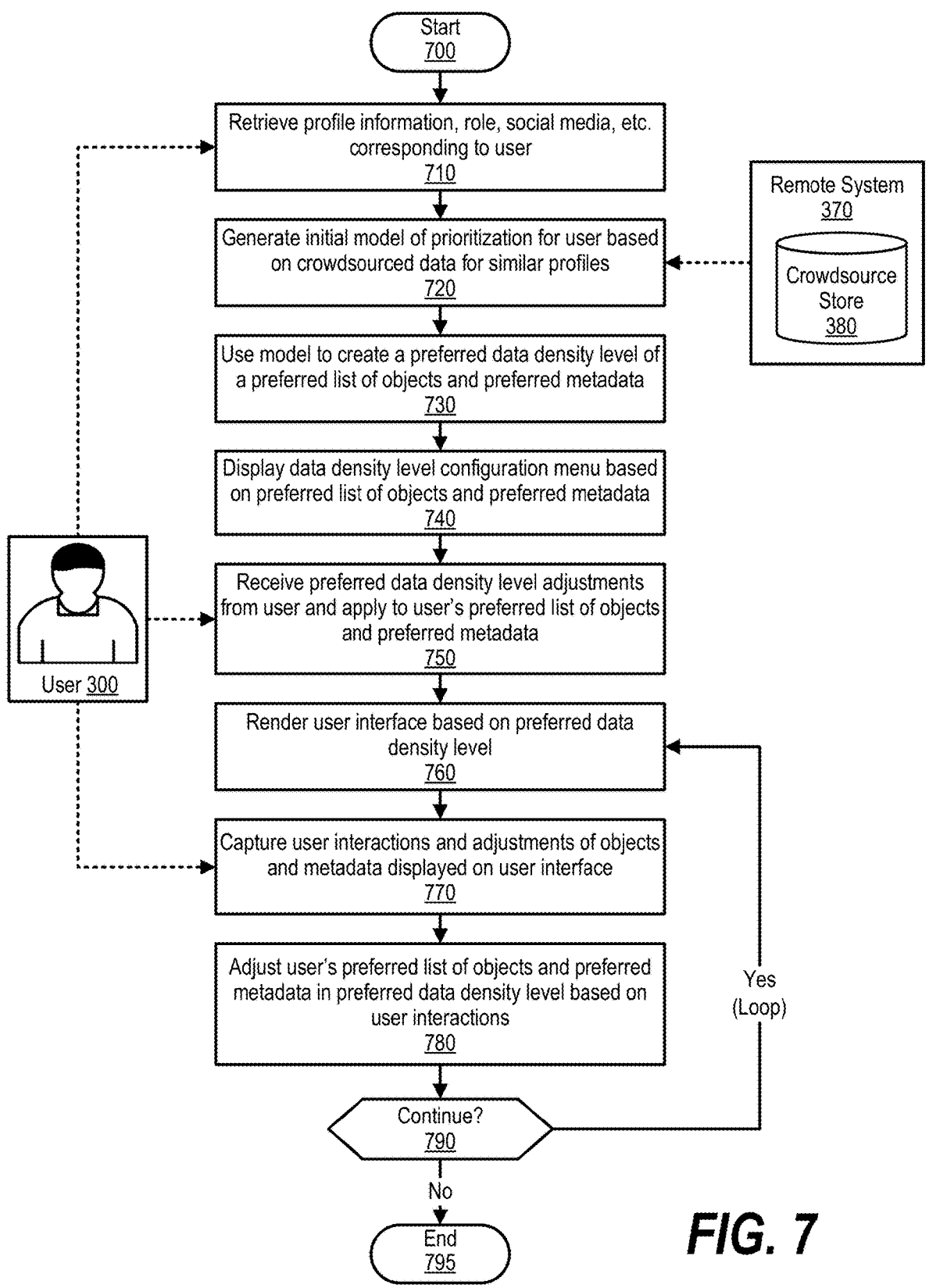
FIG. 7 is an exemplary flowchart showing steps taken in dynamically adjusting data density on a display.

FIG. 7 is an exemplary flowchart showing steps taken in dynamically adjusting data density on a display. FIG. 7 processing commences at 700 whereupon, at step 710, the process receives a user request from user 300 and retrieves profile information, role, social media, etc. corresponding to user 300. At step 720, the process generates an initial model of prioritization for user 300 based on crowdsourced data for similar profiles. For example, user 300 may be system developer in a cloud provider organization. In this example, the process uses crowdsourced data of users that are system developers in a cloud provider organization to generate an initial prioritization model for user 300.

At step 730, the process uses the initial prioritization model to create a preferred data density level of a preferred list of objects and preferred metadata and, at step 740, the process displays a data density level configuration menu based on the preferred list of objects and preferred metadata (see FIG. 5 and corresponding text for further details).

At step 750, the process receives preferred data density level adjustments from user 300 and applies the adjustments to user 300's preferred list of objects and preferred metadata. For example, user 300 may wish to receive more metadata corresponding to availability zones because user 300 has a new role of global cloud management. At step 760, the process renders a user interface based on the preferred data density level.

At step 770, the process captures user 300 interactions over time that include adjustments of objects and metadata displayed on user interface 330. For example, the process may detect that user 300 expands on objects corresponding to particular bands to obtain detailed artist and song information. At step 780, the process adjusts user 300's preferred list of objects and preferred metadata in preferred data density level based on the user interactions. Continuing with the example above, the process increases the detail metadata level for objects corresponding to the particular bands.

The process determines as to whether to continue monitoring user interactions (decision 790). If the process should continue monitoring user interactions, then decision 790 branches to the 'yes' branch which loops back to continue to monitor user 300 interactions and adjust user 300's data density levels as needed. This looping continues until the process should terminate (e.g., user 300 turns off system 310), at which point decision 790 branches to the 'no' branch exiting the loop. FIG. 7 processing thereafter ends at 795.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
capturing a set of user profile information corresponding to a user during a first user session;
generating an initial prioritization model for the user, wherein the generating is based on one or more prioritization models for a set of different users stored in a crowdsourced storage area, and wherein the generating is further based on the set of captured user profile information;
displaying a set of objects to the user on a user interface during the first user session, wherein the displayed set of objects corresponds to an object type and show a first level of detail based on the initial prioritization model, and wherein a set of metadata corresponds to the set of objects;
adjusting the initial prioritization model based on a set of user selections captured during the first user session that indicates a second level of detail of at least one object in the set of objects and a selection of a different set of objects corresponding to a different object type, wherein the set of user selections is devoid of a zoom scaling function, and wherein the adjusting changes an amount of the set of metadata to display on each of the set of objects; and
displaying the set of objects and the different set of objects to the user on the user interface during a second user session based on the adjusted prioritization model.

2. The method of claim 1 further comprising:
accessing the crowdsourced storage area to retrieve the initial prioritization model from the plurality of prioritization models, wherein the initial prioritization model is retrieved based on historical user interactions from the set of different users.

3. The method of claim 2 further comprising:
storing the adjusted prioritization model in the crowdsourced storage area.

4. The method of claim 1 further comprising:
displaying a configuration menu to the user that comprises a set of preset detail level selections based on the initial prioritization model;
receiving one or more changes from the user that changes one or more of the set of preset detail level selections; and
re-adjusting the initial prioritization model based on the received one or more changes.

5. The method of claim 1 further comprising:
in response to the adjusting of the prioritization model, monitoring user behavior of the user interacting with the set of objects; and
re-adjusting the adjusted prioritization model based on the user behavior of the user.

6. An information handling system comprising:
one or more processors;
a memory coupled to at least one of the processors;
a set of computer program instructions stored in the memory and executed by at least one of the processors in order to perform actions of:
capturing a set of user profile information corresponding to a user during a first user session;

generating an initial prioritization model for the user, wherein the generating is based on one or more prioritization models for a set of different users stored in a crowdsourced storage area, and wherein the generating is further based on the set of captured user profile information;

displaying a set of objects to the user on a user interface during the first user session, wherein the displayed set of objects corresponds to an object type and show a first level of detail based on the prioritization model, and wherein a set of metadata corresponds to the set of objects;

adjusting the initial prioritization model based on a set of user selections captured during the first user session that indicates a second level of detail of at least one object in the set of objects and a selection of a different set of objects corresponding to a different object type, wherein the set of user selections is devoid of a zoom scaling function, and wherein the adjusting changes an amount of the set of metadata to display on each of the set of objects; and displaying the set of objects and the different set of objects to the user on the user interface during a second user session based on the adjusted prioritization model.

7. The information handling system of claim 6 wherein the processors perform additional actions comprising:

accessing the crowdsourced storage area to retrieve the initial prioritization model from the plurality of prioritization models, wherein the initial prioritization model is retrieved based on historical user interactions from the set of different users.

8. The information handling system of claim 7 wherein the processors perform additional actions comprising:

storing the adjusted prioritization model in the crowdsourced storage area.

9. The information handling system of claim 6 wherein the processors perform additional actions comprising:

displaying a configuration menu to the user that comprises a set of preset detail level selections based on the initial prioritization model;

receiving one or more changes from the user that changes one or more of the set of preset detail level selections; and re-adjusting the initial prioritization model based on the received one or more changes.

10. The information handling system of claim 6 wherein the processors perform additional actions comprising:

in response to the adjusting of the prioritization model, monitoring user behavior of the user interacting with the set of objects; and re-adjusting the adjusted prioritization model based on the user behavior of the user.

11. A computer program product stored in a computer readable storage medium, comprising computer program code that, when executed by an information handling system, causes the information handling system to perform actions comprising:

capturing a set of user profile information corresponding to a user during a first user session;

generating an initial prioritization model for the user, wherein the generating is based on one or more prioritization models for a set of different users stored in a crowdsourced storage area, and wherein the generating is further based on the set of captured user profile information;

displaying a set of objects to the user on a user interface during the first user session, wherein the displayed set of objects corresponds to an object type and show a first level of detail based on the initial prioritization model, and wherein a set of metadata corresponds to the set of objects;

adjusting the initial prioritization model based on a set of user selections captured during the first user session that indicates a second level of detail of at least one object in the set of objects and a selection of a different set of objects corresponding to a different object type, wherein the set of user selections is devoid of a zoom scaling function, and wherein the adjusting changes an amount of the set of metadata to display on each of the set of objects; and displaying the set of objects and the different set of objects to the user on the user interface during a second user session based on the adjusted prioritization model.

12. The computer program product of claim 11 wherein the information handling system performs further actions comprising:

accessing the crowdsourced storage area to retrieve the initial prioritization model from the plurality of prioritization models, wherein the initial prioritization model is retrieved based on historical user interactions from the set of different users.

13. The computer program product of claim 12 wherein the information handling system performs further actions comprising:

storing the adjusted prioritization model in the crowdsourced storage area.

14. The computer program product of claim 11 wherein the information handling system performs further actions comprising:

displaying a configuration menu to the user that comprises a set of preset detail level selections based on the initial prioritization model;

receiving one or more changes from the user that changes one or more of the set of preset detail level selections; and re-adjusting the initial prioritization model based on the received one or more changes.

15. The computer program product of claim 11 wherein the information handling system performs further actions comprising:

in response to the adjusting of the prioritization model, monitoring user behavior of the user interacting with the set of objects; and re-adjusting the adjusted prioritization model based on the user behavior of the user.

\* \* \* \* \*